(12) United States Patent
Johansen et al.

(10) Patent No.: US 6,595,487 B2
(45) Date of Patent: Jul. 22, 2003

(54) ELECTRIC ACTUATOR

(75) Inventors: John A. Johansen, Kongsberg (NO); Heyn Halfdan Magnus, Kongsberg (NO); Roy Almedal, Tønsberg (NO)

(73) Assignee: Kongsberg Offshore A/S, Kongsberg (NO)

( * ) Notice: Subject to any disclaimer, the term of this patent is extended or adjusted under 35 U.S.C. 154(b) by 0 days.

(21) Appl. No.: 09/855,724

(22) Filed: May 16, 2001

(65) Prior Publication Data

US 2002/0011580 A1 Jan. 31, 2002

(30) Foreign Application Priority Data

May 16, 2000 (NO) ............................................. 20002528

(51) Int. Cl.[7] .............................................. F16K 31/02
(52) U.S. Cl. ................................................ 251/129.04
(58) Field of Search ........................ 251/129.04, 129.11

(56) References Cited

U.S. PATENT DOCUMENTS

| 4,943,187 A | 7/1990 | Hopper |
| 5,299,641 A | 4/1994 | Paulo et al. |
| 5,497,672 A | 3/1996 | Appleford et al. |
| 5,732,776 A | 3/1998 | Tubel et al. |
| 5,992,527 A | 11/1999 | Garnham et al. |
| 6,257,549 B1 * | 7/2001 | Hopper ........................ 166/363 |

FOREIGN PATENT DOCUMENTS

| EP | 0 627 544 | 12/1994 |
| EP | 0 984 133 | 3/2000 |
| GB | 2 198 766 | 6/1988 |
| GB | 2 216 570 | 10/1989 |

OTHER PUBLICATIONS

Sangesland et al. "Subsea Electrical Valve Actuator," Underwater Technology Conference 1994, International Exchange of Experience and Technology, Bergen, Norway Mar. 14–16, 1994, pp. 522–538.

* cited by examiner

Primary Examiner—Ehud Gartenberg
Assistant Examiner—Melvin Cartagena
(74) Attorney, Agent, or Firm—Young & Thompson

(57) ABSTRACT

An actuator system for actuating a valve in a subsea environment comprises a valve spindle that is arranged to be coupled to an electric motor. To provide for power to the motor, at least one local electrical storage unit is provided. The system also includes a control unit comprising switching means for controlling the power to the motor. The control unit includes an intelligent processor and is arranged to receive signals from external sensors measuring a number of external and internal parameters, The actuator is preferable housed in a modular cage for easy replacement.

5 Claims, 4 Drawing Sheets

ELECTRIC ACTUATOR

BACKGROUND OF THE INVENTION

1. Field of the Invention

This invention relates generally to a system for the control of valves in a subsea environment. More particularly, this invention relates to a system for actuating valves in oil and gas production wells and methods for controlling actuation of such valves.

2. The Prior Art

The control of subsea valves constitutes an on-going concern of the petroleum industry due, in part, to the enormous monetary expense involved as well as the risks associated with environmental and safety issues. As the exploration for oil and gas moves into ever deeper waters, the problems (and expense) associated with such activities gets ever larger.

Before describing the current state-of-the-art relative to such valve control systems and methods, a brief description will be made of the production system, per se, in need of control. Oil and gas that are produced in a well flows upward through the well tubing to a wellhead placed on the seabed. A so-called Christmas Tree is connected to the wellhead and contains a number of valves for regulating the produced fluids. These valves must be of a size to be able to contain the, often large, pressures in the well. In addition, a control module is usually provided, containing also a number of pilot valves, some for controlling the main Christmas Tree valves, but also valves for injection of chemical fluids into the well.

Known systems used for controlling the opening and closing of both the main gate valves in the Christmas Tree and others, for example injection valves, are either hydraulic, pneumatic or electro-hydraulic actuators, but the most common is the hydraulic type. These actuators generally utilize an externally controlled flow of hydraulic fluid, under pressure, to drive a piston within an actuator cylinder. This cylinder compresses a spring stack and moves the valve stem to open or close the valve depending on its configuration. In an emergency situation when the valve must be closed quickly, the spring force is used to achieve this. In a subsea environment, it is mandatory to provide the actuators with such fail-safe close configuration.

The actuators may be driven directly, that is being supplied with fluid through a line extending to the surface, or from an accumulator located on the seabed at or near the well. In the latter case, pilot valves are arranged to control the supply of fluid to the actuators. Pilot valves can be controlled hydraulically, that is with a secondary supply line from the surface, or more often electrically and is therefore called an electro-hydraulic system.

However, hydraulic actuators have a number of operational disadvantages that would make the actuator unusable for some subsea applications. For example, as the distance between the hydraulic actuator and the topside control center increases, the amount of hydraulic fluid needed to fill the lines and operate the valves also increases. Over long distances the fluid can lose pressure and therefore accumulators have to be installed close to the actuator to back up the pressure. Within some existing systems the time between a signal being sent from a control center and the actuators responding to the signal can be a matter of minutes, which in emergency situations can be too long. Furthermore, when the distance between the two sites reaches an optimum length, the hydraulic actuator will not be able to operate at all. An increase in water depth can also affect the actuator performance. The cost and size of the hydraulic lines and umbilicals also greatly increase as the operational depths and distances compound. It has therefore become apparent that a new design of actuator control is required that will not be affected by depth/distance and that will have a fast response time, and it has been decided that an all-electric valve actuator will meet these requirements.

U.S. Pat. No. 5,497,672 to Appleford et al describe a valve actuator comprising a stem extending through the actuator for coupling to the valve such that axial movement of the stem opens and closes the valve, an outer shaft arranged coaxially around the stem and in threaded engagement therewith and means coupling the shaft to an electric motor to cause rotational and thus axial movement of the shaft relative to the stem against a spring bias. The shaft is releasable retained in a predetermined position when the valve is open with the spring held in compressed state by a solenoid-actuated latching mechanism. De-activation of the solenoid mechanism, for example by a loss of electric power, releases the shaft to allow axial movement of both the shaft and stem, under action of the spring, in order to close the valve.

The above mentioned actuator needs the spring for providing the required fail safe characteristics. It is therefore not a true all electric valve actuator. Since the valves are designed so that the actuators must overcome the pressure differential between the pressure in the well and the ambient (hydrostatic) pressure, in order to open or close the valve, this spring is considered necessary to be able to close the valve at the loss of electric power. If the well pressure is higher than the ambient pressure, the return spring must be designed large enough to be able to keep the valve shut. Contraversive, if the ambient pressure is larger than the well pressure, the driving fluid pressure must be larger. At greater depths, the hydrostatic pressure will normally be several orders of magnitude higher than the well pressure and the driving fluid must not only be able to move the actuator against the return spring but also overcome the pressure caused by the water depth.

When actuators of this type has found little application for subsea use it is because of the many disadvantages found. The size of the return spring, which as mentioned above is dependent upon well pressure and ambient pressure, results in that the actuator being of the same magnitude of size as in a conventional hydraulic actuator and neither weight nor space is reduced. The latch mechanism is less operational safe and even short-time power losses will make the actuator close the valve.

U.S. Pat. No. 5,519,295 to Jatnieks describes an electric actuator comprising a stem extending through the actuator for coupling to a component such as a valve such that axial movement of the stem opens and closes the valve, an outer shaft in threaded engagement therewith via a gear train and means coupling the shaft to an electric motor to cause rotational and thus axial movement of the shaft relative to the stem. The actuator has a controller having input power connected across a capacitor and control terminals for controlling the power applied from the input power terminals to the motor which comprises the actuator's prime mover. Electric energy is stored in the capacitor and a sensor monitors the presence of power provided to the controller's input power terminals When failure of this power is sensed, the capacitor current flows to the controller, which drives the actuator to toward a the preselected (normally closing) position.

This design, however, is not very useful in a subsea environment, since a capacitor is not reliable in seawater and would need costly shielding to avoid short-circuiting, which means that it must be housed in a one atmosphere container.

EPO patent application no. 984,133 to Cooper Cameron Corp. describes a valve actuating module in a subsea environment having a plurality of valve actuators for operating respective valve elements. The module is arranged to receive primary power and control signals from an external source in order to operate the valves. The necessary failsafe condition is achieved by providing the motor with a local back-up power source which, in the event of loss of primary power, is sufficient to drive the motor to return the valve to a safe position, the back-up power source being a battery which is kept charged by the primary power source through a umbilical.

Note may also be made to the article <<Subsea Electric Valve Actuator>>, by Sigbj+e,sez o+ee rn Sangesland and Michael Golan and published in <<Proceedings from the 8$^{th}$ Underwater Technology Conference held in Bergen, Norway Mar. 14–16, 1994. This comprises an overall description of the then current thinking about using electrically driven valve actuators and discussions of the pros and cons of such a system, including suggesting using a battery as back-up.

Again, the big disadvantage of all these designs is that even a short-time power loss will make the actuator to close the valve. This is not desirable, since loss of power can have many causes, some unrelated to conditions in the well. It may well be that such non-important power losses can occur so frequently that the batteries are not sufficiently charged before the next failure happens. An uncontrolled closing of the valve may also cause disruptions to the system even after the valve is re-opened, for example because of hydrate formation.

GB Application no. 2,216,570 to Baker Hughes Inc. describes a downhole safety valve actuator that comprises an axially shiftable valve head which is movable between open and close positions by an actuating member manipulated by an electric motor. The electric motor is powered by a battery and the energization and de-energization of the electric motor is controlled by electromagnetic waves. A locking mechanism, consisting of a biased return spring controlled by an electric solenoid is also powered by the battery. A surface mounted electromagnetic wave transmitter transmits an electromagnetic signal downwardly through the earth and is received by an antenna mounted in the well and supplied to an electronic receiver unit-The electronic unit receives and amplifies the received signal and supplies it to a central processor. The processor in turns controls the supply of energy from the batteries to the electric motor for shifting the valve between open and closed positions.

SUMMARY OF THE INVENTION

The above-discussed and other problems and deficiencies of the prior art are overcome or alleviated by the control system of the present invention. In accordance with a first embodiment of the present invention, a valve control system for a subsea valve is provided that will automatically or semi-automatically operate the valve in response to sensed production or environmental parameters. An important feature of this invention is thus that the actuator will not immediately close the valve as a response to power loss, but will check other system parameters before making this decision.

In accordance with the present invention, therefore, an actuator system for actuating a valve in a subsea environment comprises a spindle axially movable between at least first and second operating positions, whereby, moving the actuator causes the valve element to move between operating positions, at least one electric motor with a rotatable output shaft, a transmission for transmitting the rotational output of the shaft into axial movement of the spindle, at least one electrical storage unit providing a source of primary power disposed proximate to the motor, and at least one control unit connected to each of said electrical storage unit, said motor and an external electrical source disposed remotely from said motor, where the control unit comprises first switching means for selectively transmitting electrical power from said electrical storage unit to said motor, second switching means for selectively transmitting electrical power from said external electrical power source to either said electrical storage unit or said motor, first sensing means for sensing the state of said electrical storage unit, said first sensing means generating a first sensor signal, second sensing means for sensing the state of said external electrical power source, said second sensing means generating a second sensor signal, and programmable processor means, said processor means being programmed to determine the desired operating position of said valve spindle and the desired source of electrical power for said motor using a plurality of input signals including at least said first and second sensor signals, and send appropriate control signals to said first and second switching means to selectively start or stop the transmission of electrical power from said desired source of electrical power to said motor to achieve said desired operating position of said valve spindle.

With this arrangement, the coupling, which only transmits the rotary motion from the motor into axial motion of the spindle, is unaffected by hydrostatic pressure and a return spring is nor required. Thus the electric power to operate the device is much reduced as all that is required is sufficient power to overcome the friction between the device element and housing seals. Further, because each actuator is provided with its own self-contained power source, the transmission power loss can be significantly reduced.

In a preferred embodiment, the motor, and the power source is housed in a module which is arranged to be coupled to, and decoupled from, the wellhead assembly by, for example, a diver or ROV. In this case, the coupling between the rotatable actuator and the rotatable part of he device will be a torque-transmitting interface, such as splined or keyed coupling, which can be engaged and disengaged by relative axial movement. Preferable this coupling is of a standardized designed, that will interface with a ROV manual override tool, to ensure operation of the valve even with the module disengaged from the device.

It is advantageous to use two motors coupled to the same output shaft, with a battery each. This ensures a redundancy and a safety factor that results in safer operation.

By using a battery as the principal power source, the large and bulky primary power umbilical can be significantly reduced, resulting in lower costs.

The control unit should be an intelligent programmable processor that can make decisions based on the state of the system, ensuring that the valves do not close for minor glitches in the system.

In accordance with a second embodiment of the invention there is disclosed a method for controlling actuation of a valve installed in a subsea environment, said valve comprising a spindle axially movable between at least first and second operating positions, said method comprising the steps of providing an electrically powered actuator for moving said valve spindle between said operating positions; providing an electrical storage unit disposed proximate to said motor; providing an external electrical power source located remotely from said motor; monitoring the state of said electrical storage unit; monitoring the state of said external power source; determining the desired operating position of said valve spindle and the desired source of power for said motor based on states of said electrical storage unit and said external power source; and connecting said desired power source to said motor such that said valve spindle is moved to said desired operating position.

BRIEF DESCRIPTION OF THE DRAWINGS

Referring now to the drawings, wherein like elements are numbered alike in the several figures.

DESCRIPTION OF THE PREFERRED EMBODIEMENT

Figure 1:
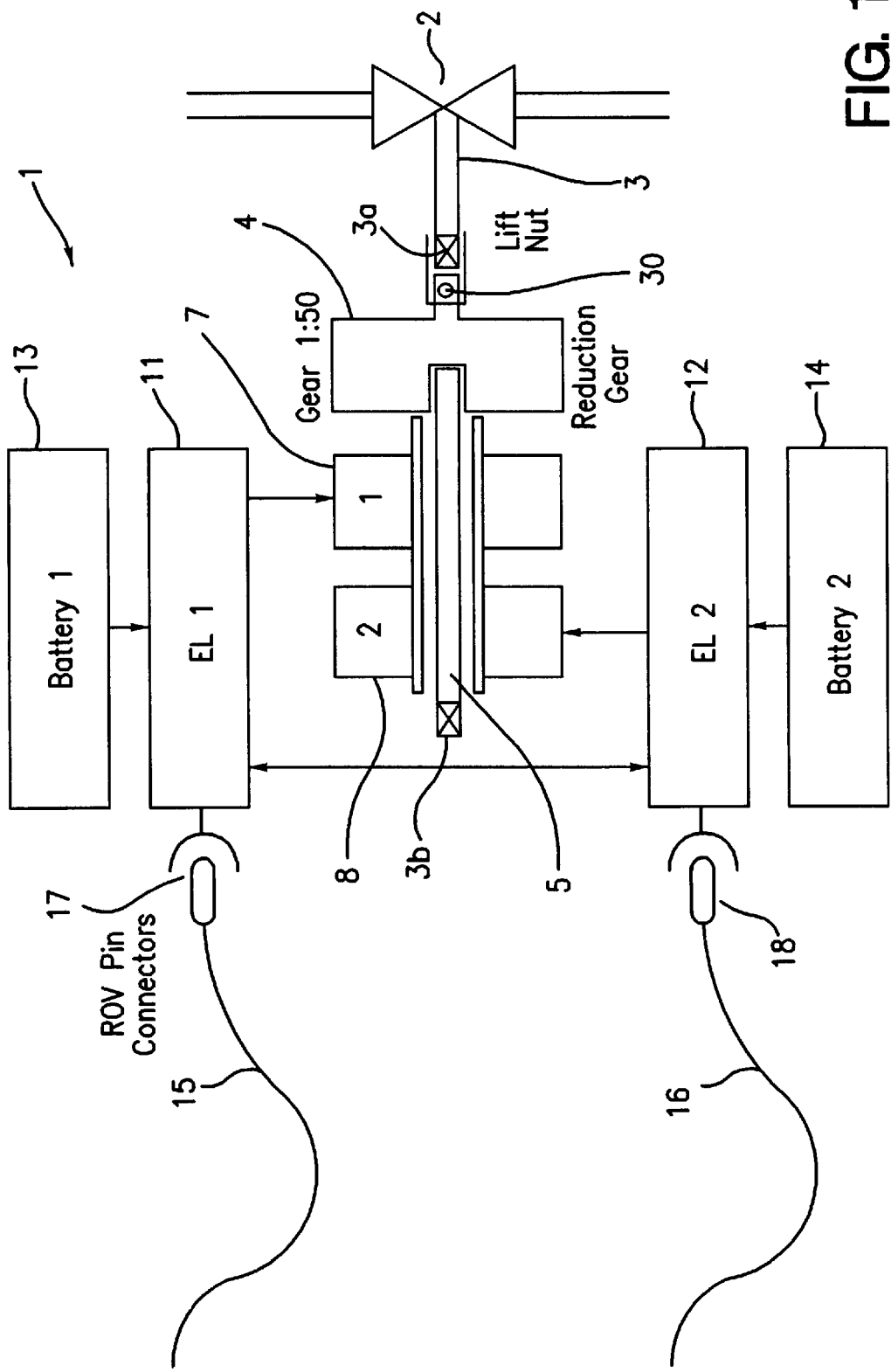
FIG. 1 is a diagrammatic view of an electric actuator of the present invention.

Referring firstly to FIG. 1, a valve 2 is operated by an electric actuator 1. The valve may as an example be a conventional gate valve with a valve spindle 3. The valve spindle 3 is at one end equipped with a coupling 3a. The end coupling may include a rotary to linear converter, when the valve is a sliding type valve. The end coupling is designed with an interface allowing it to be rotated by a standard tool of a remotely operated underwater vehicle (ROV), usually referred to as a manual override. This allows the valve to be operated even if the gearbox and motor has been decoupled from the valve spindle. The output shaft 30 of a reduction gear 4 has a corresponding interface.

Into the gear input side is a drive shaft 5 that is the output shaft of an electric motor 7, 8. The driveshaft 5 runs through the motor and has at its end 3b an interface, similar to the above, allowing manual override of the valve by using an ROV. The output shaft of the reduction gear may comprise a momentum limiter.

Twin electric motors 7 and 8 are both operatively coupled to the driveshaft 5. The motors are preferably of the brushless type, which are preferable for subsea use. The <<brushless>> refers to that the motors have no armature, but is based on permanent magnets, as is well known in the art. Motors of this type are especially suited to the purpose as they can be exactly controlled on moment, speed and position. They can be run on direct current and thus simplifies the desired battery operation. The motors are preferably run in an oil-filled environment so that they can be pressure compensated for use at great depths.

Each motor is by wires 9, 10 operatively connected to a control unit 11, 12, respectively. The motors receive power through cables 15 and 16 that in turn are connected to a power cable (not shown). The cables 15 and 16 are coupled to its respective module using wet mate connectors. Each motor has a battery 13 and 14 respectively that can supply power to the motors via the control unit.

Each motor is thus provided with its own control unit and battery. As shown the motor 7 is connected to the control unit 11 and the battery 13. The motor may then be supplied power from either the power supply topside or the attached battery. The use of both the alternative power supply and that there is provided a double set of power supply makes for a double redundancy of the system such that if the external power supply fails, the motor(s) can be supplied from the batteries. In addition, the two modules may be interconnected so that if one power supply fails, the other can be used to run both or any of the motors. The two parts are identical and any one of the motors have sufficient size to operate the actuator. They can therefore be used as a pair or alone.

The battery and control units are parts of a module that is releasable coupled to its respective motor. In this way, the module can be retrieved to the surface in case of failure or for maintenance purposes without having to close the valve. In case of an emergency the valve can be closed using the ROV manual override as shown. As an alternative, the module can comprise both the control unit, the battery and the motor/gear unit, as will be described in more detail later.

The control unit comprises means for operating the motors, sensors for measuring the state of the system and receivers for receiving input from external sensors. Such sensors may include, but not limited to, pressure and temperature sensors, means for measuring the drive shafts position, means for measuring the valve spindle position and means for measuring the number of motor turns. Especially, the control unit comprises an intelligent processor that is able to analyze the state of the system base on input from the sensors. For example, a unit, if its power supply has failed, can inquire its twin counterpart about its state. If the other unit is operative, the unit should decide not to close the valve automatically but instead send a message to a control center topside and wait for instructions. Preferable it should be programmed to send the message and wait for a specified time interval and then close the valve if no return signal is received.

Figure 2:
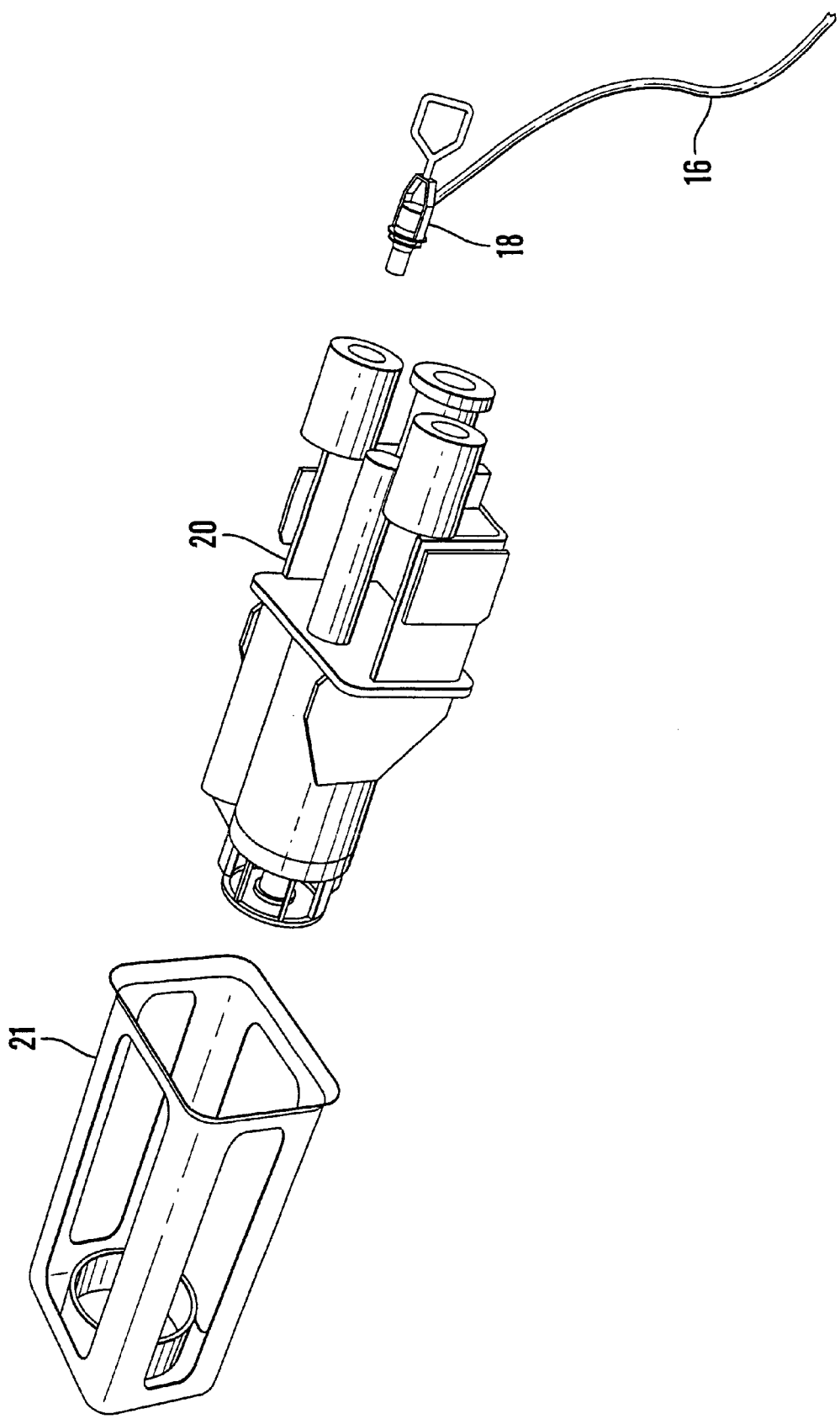
FIG. 2 is a schematic drawing showing an actuator module.

In FIG. 2 is shown an example of a releasable control unit 20. A frame or adapter 21 is designed as a <<cage>> supporting the module and designed to be operatively coupled to the valve spindle 3. The motor, control unit and batteries are a compact unit. As the module is releasable coupled to the valve spindle, the module can be retrieved to surface for maintenance. Since the end of the valve spindle has an ROV manual override interface, the valve may still be opened or closed even when the module is decoupled.

Figure 3:
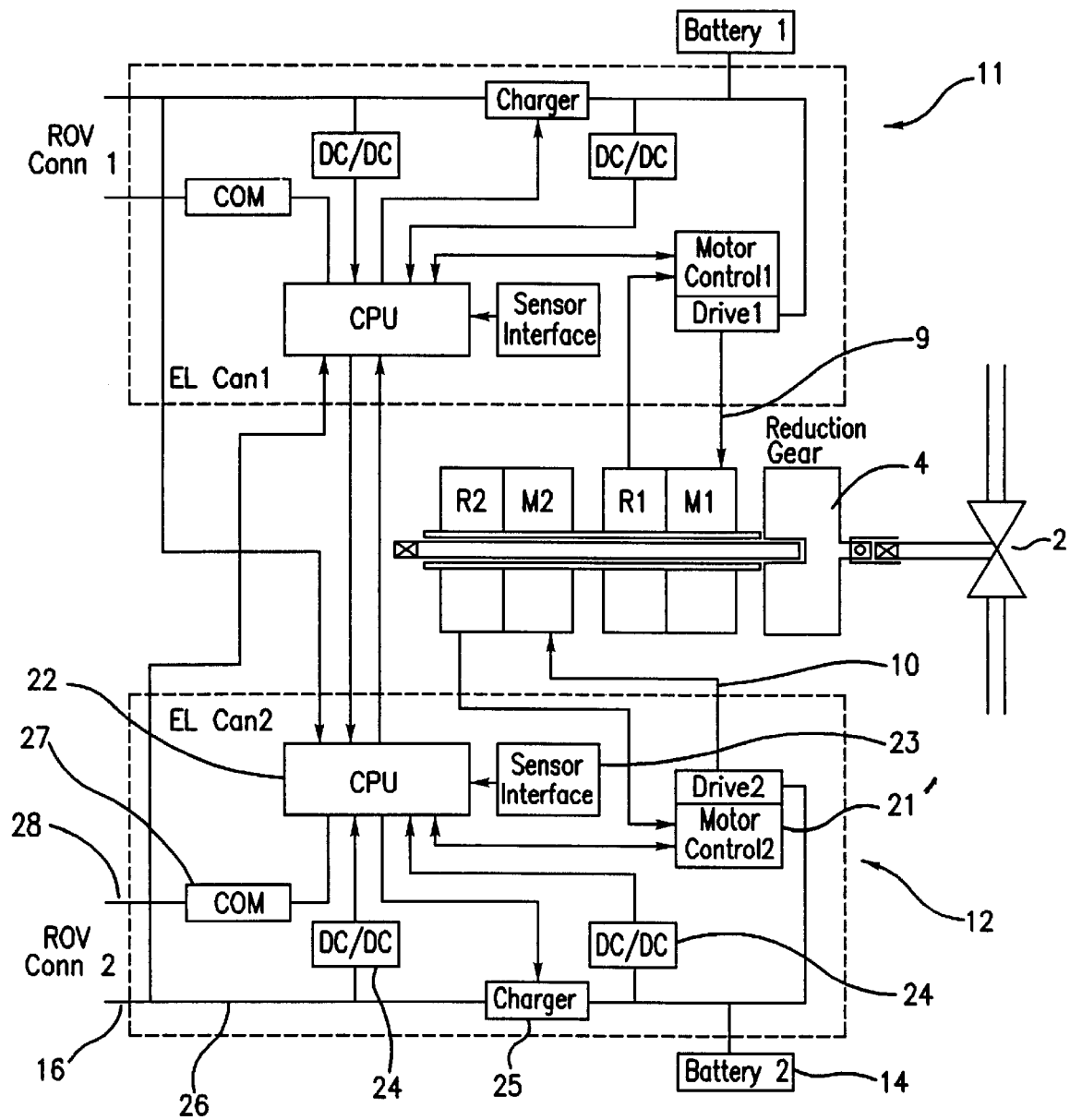
FIG. 3 is a block diagram showing showing the control system for the actuator.

In FIG. 3 is shown a block diagram of the parts of the control unit 1. This comprises a unit 21' for the motor 8 through the wire 10, a central processing unit 22 which receives signals from the unit 21', a sensor unit with instruments 23 and a DC/DC (or AC/DC) converter 24.

The cable 16 is connected to the power cable 26 in the control unit. As will be apparent from the drawing, the cable is connected to one or more DC/DC converters and a charging unit 24 for the battery. The charging unit is controlled by the central processing unit 22.

The cable 16 also includes signal wires that via a wire 28 is connected to a receiver 27. The receiver may be an analogue or digital modem. The receiver 27 is operatively connected to the processor 22.

The power cable is connected to the battery 14 via the charging unit 25.

In addition, several other wires may be arranged between the processor 22 in the control unit 12 and its twin counterpart in the control unit 11. Also the power cable 26 can be connected to its counterpart in the control unit 11. This ensures a power supply to both units even if one or the other of the power supply lines 15 or 16 are inoperative.

When the two control units 11 and 12 respectively are enclosed in separate modules, the connection between them will be a cable that is wet mated to the modules using an ROV. If they are built into a single module, this connection will of course be fixed.

In a preferred embodiment of the invention it is envisaged that the battery constitutes the principal and primary source of power supplied to an actuator. The close proximity of the battery to the motor ensures smaller power losses. When main power is supplied from topside, the umbilical cable must be sized to be able to close all valves in a Christmas Tree, requiring substantial power. In the present arrangement, the cable from topside can be of a size enabling, for example, one battery to be charged at a time and at a lower rate, for example one hour. This will reduce the size of the umbilical considerably and results in a significant reduction of umbilical cost.

Figure 4:
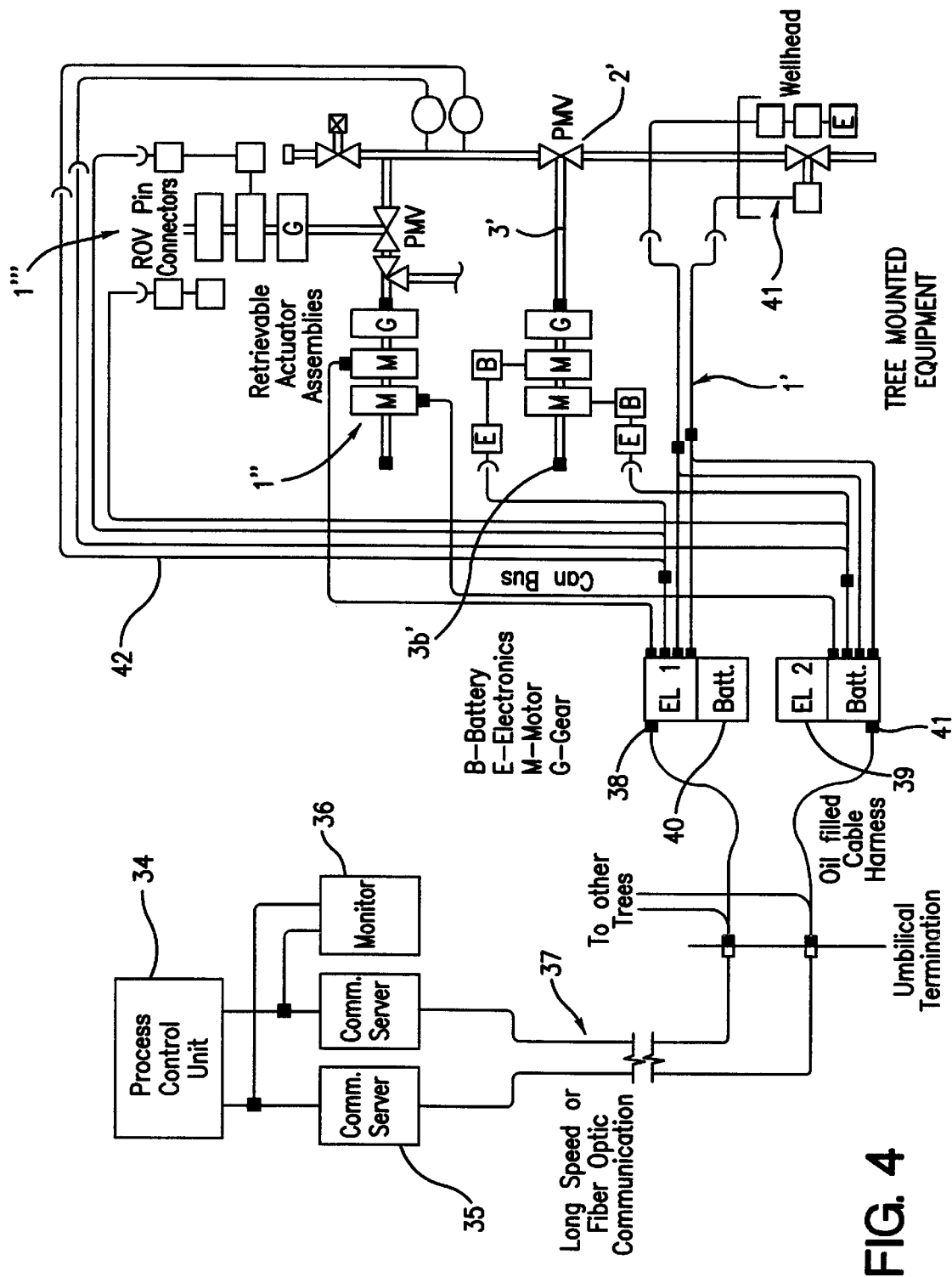
FIG. 4 is a block diagram showing a well layout.

In FIG. 4 is shown an embodiment of the control system used on a subsea well. As usual, there is provided a production master valve 2', a production wing valve 1''' and a choke 1" as is the standard for a Christmas Tree. Each valve may be equipped with an electric actuator according to the invention. In addition, this type of actuator can be used for a downhole safety valve.

The respective valves 1', 1" and 1''' are each fitted with electric actuators of the type shown in FIG. 2. This includes the valve 2', the valve spindle 3a' and the ROV manual override interface end 3b'.

A process control unit 34 located at a remote location, for example topside, may comprise one or more intelligent communication servers 35. This may be a computer terminal with monitor 36 from which an operator may survey the state of the system. From the communication server 35 extends one or more umbilicals 37 to a location at the seabed. The umbilical includes power cables for the supply of electricity and wires for signal transmission. The latter may be fiber optic cable.

Electric power may also be supplied by other means, for example by acoustic transmission or by electricity locally generated from a source located on the seabed.

The umbilical may be connected with several wells. The umbilical is terminated in a number of, preferably two, main control units 38, 39. These are equipped to control all functions for one or more wells. Each main control unit 38, 39 comprises a battery 40, 41 respectively for the supply of power in an emergency situation. From each main control unit cables extend to each actuating device on the Christmas Tree. Each main control unit is equipped to control any or all functions of the well.

It should be noted that devices that may be actuated using the present invention not only be Christmas Tree valves but also injection valves for chemical fluids, sensors and so on.

The system should thus have a built-in redundancy for all type of control of the well. Therefore, instead of having a local power module for each actuator, a compact actuating-only module can be fitted to each valve (or other actuating device), consisting of only motor and gear plus necessary sensors. The centrally located batteries 40 or 41 can then be arranged to supply power to any actuator.

The programmable logic in the control units will at any time check the state of the system and react to any fault that may occur. The use of <<smart>> intelligence in the logic ensures that the control unit will not automatically shut one or all valves upon detecting a fault, but will be programmed to search for the reason of the fault, even correcting the fault if possible, and decide whether the fault warrants the valve(s) to be closed or not. For example, in case of failure in one supply cable, the logic may inquire about the state of the other supply cable. In that case, valves are not shut but instead a message is sent to the station 34 topside.

If the processor detects that both supply cables have failed, the logic may further test the system before it issues the orders to close the valves. It may for example Close the valve after a predetermined time has passed.

Check for the pressure in the production pipeline. If the pressure is stable and within the norm, it can decide not to close the valves.

Check for the supply of ethanol or methanol. This is crucial for inhibiting hydrate formation in the system. An interruption in this supply should cause the processor to issue commands to shut down the well.

It may also be discovered that the charge levels in the batteries are falling. A lower limit may be set, below which Immediate closing of the valves if both batteries are low.

Not closing the valve if the other battery has sufficient charge and initialize charging of the run down battery.

The battery with low charge may not be charged because of a fault. Message will then be sent topside so that retrieval and repair of the faulty module can be initiated.

The processor may be programmed so that a battery will not be discharged below the lower limit of charge that is necessary to operate the valve(s).

The actuator system of the invention provide important features and advantages including a novel means for ensuring a flexible fail safe operational mode as well as novel means for ensuring a better system redundancy.

While preferred embodiments have been shown and described, modifications and substitutions may be made thereto without departing from the spirit and scope of the invention. Accordingly, it is understood that the present invention has been described by way of illustrations and not limitation.

What is claimed is:

1. An actuator for an undersea valve with an axially movable spindle, the actuator comprising:

an electric motor having an output arranged and adapted to be operatively coupled to an axially movable spindle of an undersea valve;

an electrical storage unit that is a primary source of power for said motor;

a communication device that communicates with an external control; and a control unit connected to said motor, said electrical storage unit, said communication device, and to an input for receiving power from an external source that is a secondary source of power for said motor, said control unit having a programmable processor that monitors said electrical storage unit and controls operation of said motor, wherein when said electrical storage unit has insufficient electrical power said processor communicates with the external control through said communication device and delays operating said motor to cause the undersea valve to close awaiting a response from the external control.

2. The actuator of claim 1, further comprising a support frame arranged and adapted to be connected to the undersea valve, and wherein said electrical motor, said electrical storage unit, said communication device, and said control unit are in a single fitting that is removably attachable to said support frame.

3. A method of controlling an actuator for an undersea valve with an axially movable spindle, the method comprising the steps of:

operatively connecting an output from an electric motor to an axially movable spindle of an undersea valve;

connecting an electrical storage unit to the motor as a primary source of power for the motor;

providing a communication device that communicates with an external control;

operatively connecting a control unit having a programmable processor to the motor, the electrical storage unit, the communication device, and to an input for receiving power from an external source that is a secondary source of power for the motor, the control unit monitoring the electrical storage unit and controlling operation of the motor; and when the electrical storage unit has insufficient electrical power for the valve, the processor communicating with the external control through the communication device and delaying operating the motor to cause the undersea valve to close awaiting a response from the external control.

4. The method of claim 3, further comprising the steps of combining the electrical motor, the electrical storage unit, the communication device, and the control unit in a single fitting, and removably attaching the fitting to a support frame attached to the undersea valve.

5. The method of claim 3, wherein the processor operates the motor to cause the undersea valve to close if no response is received from the external control in a first time period.

\* \* \* \* \*